UNITED STATES PATENT OFFICE.

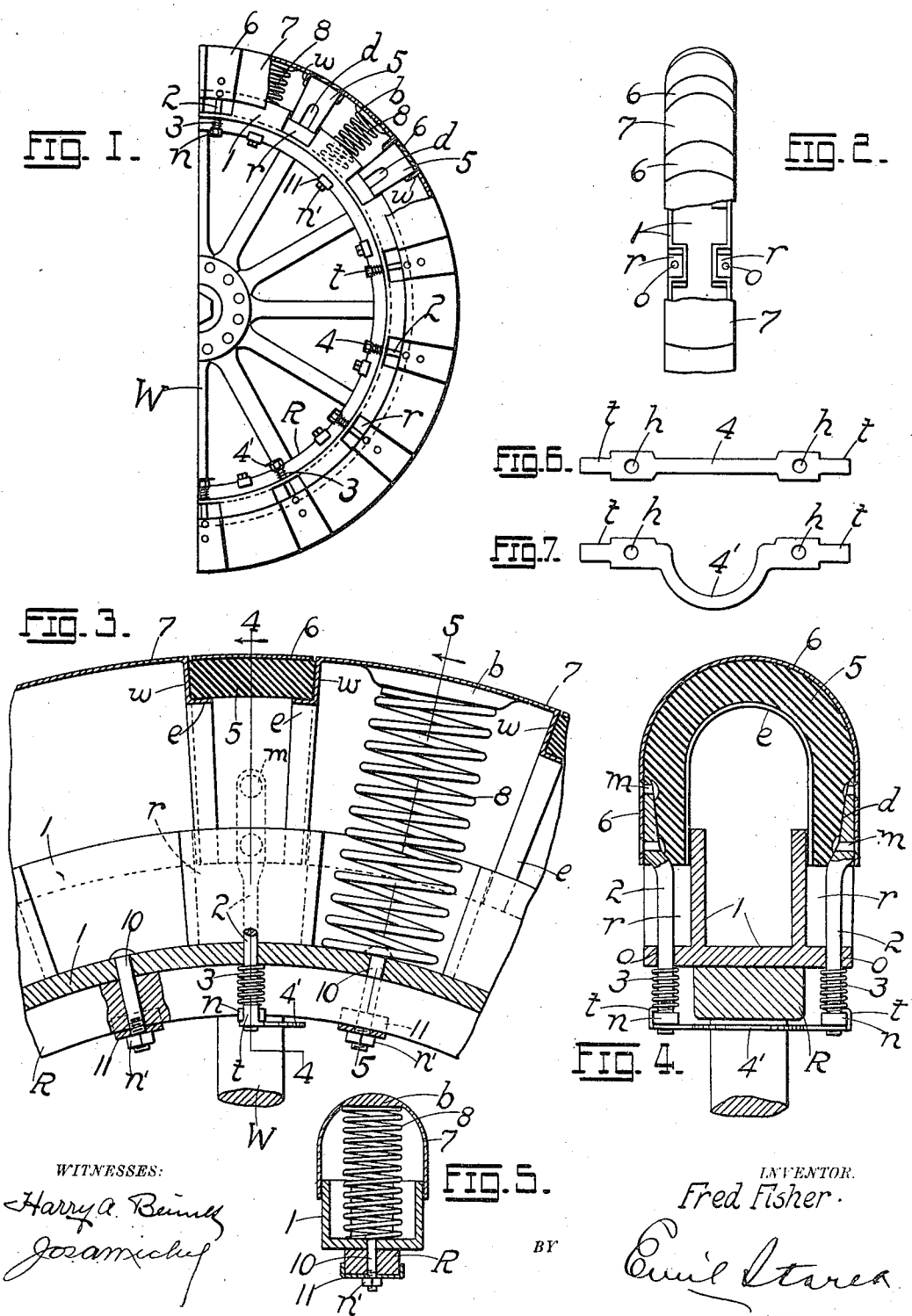

FRED FISHER, OF ARCADIA, MISSOURI, ASSIGNOR OF ONE-FOURTH TO ANTON C. IMMER, ONE-FOURTH TO FRANK L. REICHERT, AND ONE-FOURTH TO WILLIAM SELINGER, ALL OF ARCADIA, MISSOURI.

VEHICLE-WHEEL TIRE.

1,235,965.  Specification of Letters Patent.  Patented Aug. 7, 1917.

Application filed April 5, 1917. Serial No. 159,947.

*To all whom it may concern:*

Be it known that I, FRED FISHER, a citizen of the United States, residing at Arcadia, in the county of Iron and State of Missouri, have invented certain new and useful Improvements in Vehicle-Wheel Tires, of which the following is a full, clear, and exact description, reference being had to the accompanying drawings, forming a part hereof.

My invention has relation to improvements in vehicle-wheel tires; and it consists in the novel features of construction more fully set forth in the specification and pointed out in the claims.

The object of my invention is to dispense with the prevailing pneumatic tire and substitute in lieu thereof a tire which will answer the same purpose and at the same time be free from the many objectionable features of pneumatic tires, the most serious of which is the collapsibility of the tire in the event of puncture of the inner inflatable tube. My present invention dispenses with both the inflatable tube and its outer casing, the tire being composed of a series of yielding, elastic sections in the form of rubber and spring-controlled elements alternating with one another and so disposed as to yield under the load imposed thereon in much the same way as a pneumatic tire. The advantages of the invention will be apparent from the following detailed description in connection with the accompanying drawing in which—

Figure 1 represents a side elevation partly in section of one-half of a vehicle wheel showing my invention applied thereto; Fig. 2 is an edge view of a portion of the wheel, with parts broken away; Fig. 3 is a central section in the plane of rotation of the wheel through the felly ring and tire, parts being in elevation; Fig. 4 is a radial cross-section on the line 4—4 of Fig. 3; Fig. 5 is a radial cross-section somewhat reduced, on the line 5—5 of Fig. 3; and Figs. 6 and 7 are detached views of the nut-locks or straps used in connection with the tire sections.

Referring to the drawings, W, represents the spoked portion of a wheel and R, the felly, as well understood in the art. In the present embodiment of my invention, the felly is provided with a felly channel-ring 1 whose web portions have formed at intervals and at points opposite one another the radial pockets or recesses $r$ substantially U-shaped in cross-section and open at their outer ends as shown (Figs. 2 and 4). The bottoms of the recesses are provided with openings $o$ through which loosely play the radial bolts or screw stems 2, whose inner terminals are provided with nuts $n$ between which and the felly ring 1 are interposed expansion springs 3. To prevent the nuts from unscrewing or working loose I provide suitable nut-locks in the form of straps 4 which pass inside the felly R, the terminals of the straps being provided with holes $h$ for the passage of the bolts, the straps being provided beyond the holes $h$ with tongues or reduced extensions $t$ which are subsequently bent against the nuts, thereby preventing the straps from working loose from the nuts and at the same time locking the nuts against rotation. Where a strap comes opposite a spoke, a special bowed strap 4' is employed as shown in Fig. 7, the bowed portion spanning the spoke as shown in Fig. 4. In other respects the strap 4' is the same as the strap 4.

The outer ends of the stems or bolts 2 are flattened, the flattened portions being received by suitable depressions $d$ formed in the outer sides of the rubber, or equivalent elastic bowed tire section 5, the latter being covered by an outer metallic facing 6 whose terminals overlap the flattened ends of the stems 2 to which they are secured by rivets $m$ or otherwise. The ends of the sides of the bowed tire sections 5 are received by the pockets $r$ between whose side walls said tire sections are free to play radially, each section being connected to the felly ring 1 through the radially movable stems or bolts 2. Alternating with the rubber tire sections 5 are the metallic shell tire-sections 7 which, like the sections 5 are bowed across the plane of rotation of the wheel, the sides of the sections 7 overlapping the flanges or flanged portions of the channel felly ring 1. Each shell section 7 terminates in an arched wall or abutment $w$ bearing against the adjacent terminal face of the rubber tire section 5, a section 5 being thus confined between the walls $w$ of two adjacent sections 7 (Fig. 3). The walls $w$ are formed with arched flanges $e$ turned outwardly from the walls $w$ and telescopically engaging the sections 5, a section 5 receiving the flanges e of the shell sections 7 at opposite ends thereof whereby the several sections 5 and 7 are yieldingly locked together, the flanges e not only serving to sustain the sections 5 against collapse, but preventing the sections 7 from dropping out. Interposed between the inner face of the tread portion of each shell section 7 and the cylindrical web of the channel felly ring 1 is an expansion spring 8, the outer end of the spring bearing against a thickened portion or boss b on the shell section, the inner end of the spring bearing directly on the web of the felly ring. The felly ring is secured to the felly R at intervals by bolts 10 the nuts n' of which engage suitable washers 11 whose terminals are bent against the sides of the felly (Fig. 5).

The tire derives its resiliency both from the springs 8 engaging the metal shell sections 7 and from the springs 3 which control the rubber sections or cushions 5 through the stems 2. As the wheel rotates about its axis, the weight it supports will naturally rest on the sections 5 and 7 which are at the bottom or in contact with the ground, said weight necessarily imposing compression on the springs 8 and causing the section 7 to move or yield toward the axis or center of the wheel. In this yielding the flanges e recede from the sections 5, but only for a brief interval, being restored against said sections with the further rotation of the wheel the moment the sections 7 leave the ground. The springs 3 by their natural expansion tend to draw the sections 5 toward the flanges e. As the wheel continues to rotate the springs 8 in leaving the ground begin to recover or expand, while the springs 3 will contract, this action being inevitable since the springs 8 and 3 are on opposite sides of the web portion of the channel felly ring 1. The springs 8 are the stronger springs of the two as they have the weight of the load to carry, while the springs 3 in the main have only to assist in restoring the sections 5 to their seats on the flanges e. The alternate compression and expansion of the springs 8 and 3, together with the attendant resilient action of the rubber sections 5, produce a very elastic and comfortably riding tire. The depth of the flanges of the channel felly ring 1 is sufficient to afford the necessary radial play to the tire sections 5 and 7 without danger of the sections leaving the flanges, the sides of the sections overlapping the flanges for a depth in excess of the maximum radial movements to which they may be subjected while in service. The felly ring as a whole is herein designated by the numeral 1, no specific designation being given to either the web or flanged portions of the ring. The bottom walls of the pockets r through which play the bolts 2 are to be considered herein as a part of the web portion of the channel felly ring. The interlocking of the several tire sections as herein shown permits of a perfect freedom of play between the sections, so that as the wheel rotates no jar is felt by the occupants of the car. Circumferential or rotary displacement between the sections is prevented by the walls w, and by the side walls of the recesses or pockets r in which the sides of the bowed rubber or resilient sections 5 are movably confined.

I may of course depart from the details here shown without in any wise departing from the nature or spirit of the invention.

Having described my invention what I claim is:

1. In combination with a channel felly ring provided with series of radially and oppositely disposed pockets along the outer faces of the flanges of the ring, the outer ends of the pockets being open, cushioning tire sections spanning the felly ring and having their sides guided by and radially movable in the pockets aforesaid, stems leading from the sides of the tire sections aforesaid and passing loosely through the web of the channel ring, nuts on the stems within the ring, expansion springs encircling the stems and interposed between the nuts and the inner face of the web of the felly ring, and spring-controlled coöperating tire sections movably interlocked with the first mentioned sections, and movable radially to and from the web of the felly-ring.

2. In combination with a channel felly ring having radial pockets formed opposite one another in the outer faces of the flanges of the ring and spaced apart, bowed tire sections spanning the ring and having their sides guided in the pockets aforesaid, coöperating shell tire-sections spanning the ring and overlapping the outer faces of the flanges thereof, the opposite ends of the shell sections having arched walls engaging the adjacent ends of the first mentioned tire sections arranged alternately with the shell sections around the felly-ring, flanges leading from the arched walls of the shell sections and entering telescopically the first mentioned tire sections, and expansion springs interposed between the web of the felly ring and the tread portions of the shell sections, the parts operating as and for the purpose set forth.

3. A tire comprising a series of bowed rubber sections spanning the felly of the wheel, a second series of bowed tire sections alternating with the first sections, said second sections being composed of metal and having arched terminal walls abutting against the ends of the rubber sections, flanges leading from said arched walls and engaging the inner faces of the rubber sections, metallic facings for the rubber sections, expansion springs interposed between the outer face of the felly and the metal sections, and expansion springs disposed on opposite sides of the felly and mounted to coöperate with the first mentioned springs, the one set of springs contracting while the other is expanding, and vice versa, the parts operating substantially as and for the purpose set forth.

4. A tire section comprising a bowed metal shell member having a terminal inwardly turned abutment and an outwardly projecting flange leading from said abutment, in combination with a coöperating rubber tire-section passed over the flange of the first section and bearing with its end against the abutment of said first section, as set forth.

5. In combination with a felly and felly ring, a series of bowed tire sections spaced apart circumferentially and provided at the sides with stems passing loosely through the felly ring, springs disposed on the inside of the felly ring for controlling said sections, a series of tire sections alternating with the first series and interlocked therewith and bearing against the ends of the same, and springs interposed between the tread portions of said second series of sections and the periphery of the felly ring.

In testimony whereof I affix my signature in presence of two witnesses.

FRED FISHER.

Witnesses:
WM. R. EDGAR, Jr.,
ROBERT P. WHITWORTH.

Copies of this patent may be obtained for five cents each, by addressing the "Commissioner of Patents, Washington, D. C."